(No Model.)
J. W. MALOY.
IMPLEMENT FOR REDUCING STONE, &c.
No. 409,051. Patented Aug. 13, 1889.
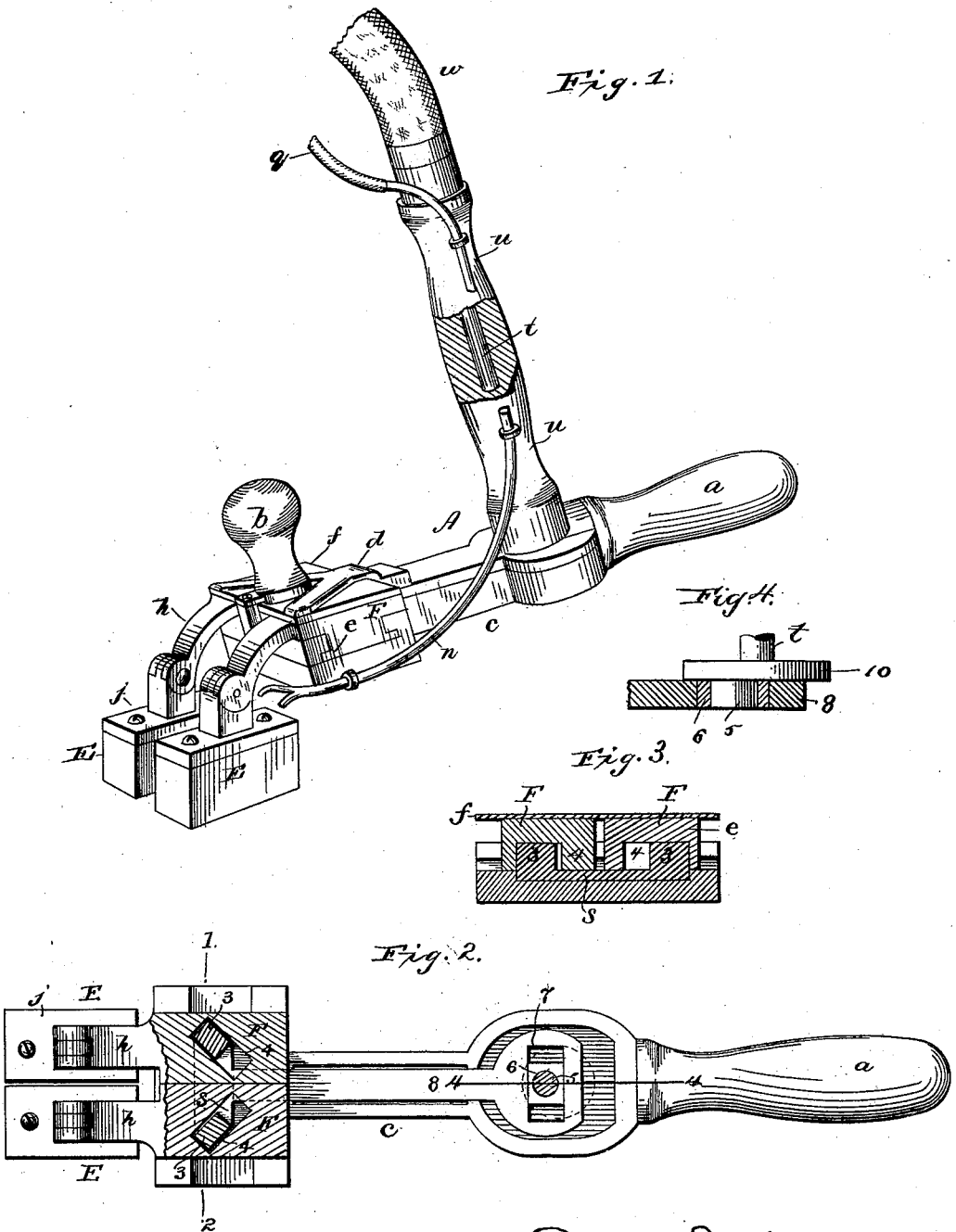

UNITED STATES PATENT OFFICE.

JAMES W. MALOY, OF MARIETTA, GEORGIA.

IMPLEMENT FOR REDUCING STONE, &c.

SPECIFICATION forming part of Letters Patent No. 409,051, dated August 13, 1889.

Application filed December 24, 1887. Serial No. 258,904. (No model.)

*To all whom it may concern:*

Be it known that I, JAMES W. MALOY, a citizen of the United States, residing at Marietta, Cobb county, Georgia, have invented certain new and useful Improvements in Implements for Reducing Stone, &c., of which the following is a specification.

My invention relates to that class of reducing implements in which vibrating rubbers or grinders are carried by a portable frame; and my invention consists in constructing the implement and arranging and operating the parts thereof, as fully hereinafter set forth and claimed, and as illustrated in the accompanying drawings, in which—

Figure 1 is a perspective view, in part section, of a stone-reducing implement, illustrating my invention. Fig. 2 is a sectional plan. Fig. 3 is a transverse section on the line 1 2, Fig. 2. Fig. 4 is an enlarged partial section on the line 4 4, Fig. 2.

The frame A of the implement has a body $c$ extended to form a terminal handle $a$, and is provided at the opposite end with a knob-handle $b$. Upon the end adjacent to the handle $b$ are supported two carriages F F, which are suitably guided to slide to and from each other. As shown, each carriage F has a dovetailed projection $e$ fitting a similar transverse groove in the frame, and a cap-piece $f$ covers the carriages and is held in place by a bracket $d$. Each carriage supports a suitable reducing-tool E, which I preferably hinge to the carriage, so that when the frame is supported in any position the faces of the tools will lie flat upon the surface to be reduced whatever may be the angle of said surface to the frame. Thus each carriage has a bracket or arm $h$, to which is pivoted by a transverse pin a plate $j$, carrying the rubber block or other tool E, secured detachably to said plate.

By suitable appliances the carriages are carried first toward and then from each other, these reciprocations being exceedingly rapid, so that the surface subjected to the action of the tools is speedily reduced, while no nice adjustment of the implement is necessary to present the surfaces of the tools flat to the face operated on.

The preferred means for reciprocating the carriages, and that shown herein, consists of a plate, $s$, carrying studs 3 3 entering inclined slots 4 4 in the carriages F F, said plate having a reciprocating motion longitudinally of the frame, and imparting by the joint action of the studs and inclined slots lateral reciprocation to the carriages.

The movements of the plate $s$ are derived from a spindle $t$, carried by a hollow stem $u$, projecting from the frame, the spindle terminating at its lower end in a concentric disk 10, carrying on its under side an eccentric-pin 5, which enters a block 6, sliding in a cross-opening 7 in the head of a bar 8, sliding in bearings in the frame and carrying the plate $s$. The rotary movement is imparted to the spindle $t$ by means of a flexible shaft $w$, which permits the implement to be moved to and held in any desired position.

To clear away the dust resulting from the action of the tools, I secure to the implement an air-pipe $n$ with its nozzle pointing toward said tools and connected with a flexible air-pipe $q$. (Shown in Fig. 1.)

It will be obvious that the lugs 3 may be on the carriages and the slots in the plate $s$.

Without limiting myself to the precise construction and arrangement of parts shown and described, I claim—

1. A tool for reducing stone, &c., consisting of a portable or hand frame supporting two carriages arranged in line, tools connected to said carriages, an operating-spindle, and a connection between the spindle and carriages, substantially as and for the purpose described.

2. The combination, with the portable or hand frame, of a rotatable spindle carried thereby, two carriages arranged in line with each other and movably supported at one end of the frame, tools connected to the carriages, and a reciprocating plate connecting the spindle and both carriages, substantially as and for the purpose set forth.

3. The combination, with the frame, driving-spindle, and laterally-movable tool-carriages arranged in line, of a longitudinally-reciprocating plate connected at one end to the spindle by an eccentric and at the other end to the carriages by lugs and diagonal slots, substantially as and for the purpose described.

In testimony whereof I have signed my name to this specification in the presence of two subscribing witnesses.

JAMES W. MALOY.

Witnesses:
F. L. FREEMAN,
J. S. BARKER.